UNITED STATES PATENT OFFICE.

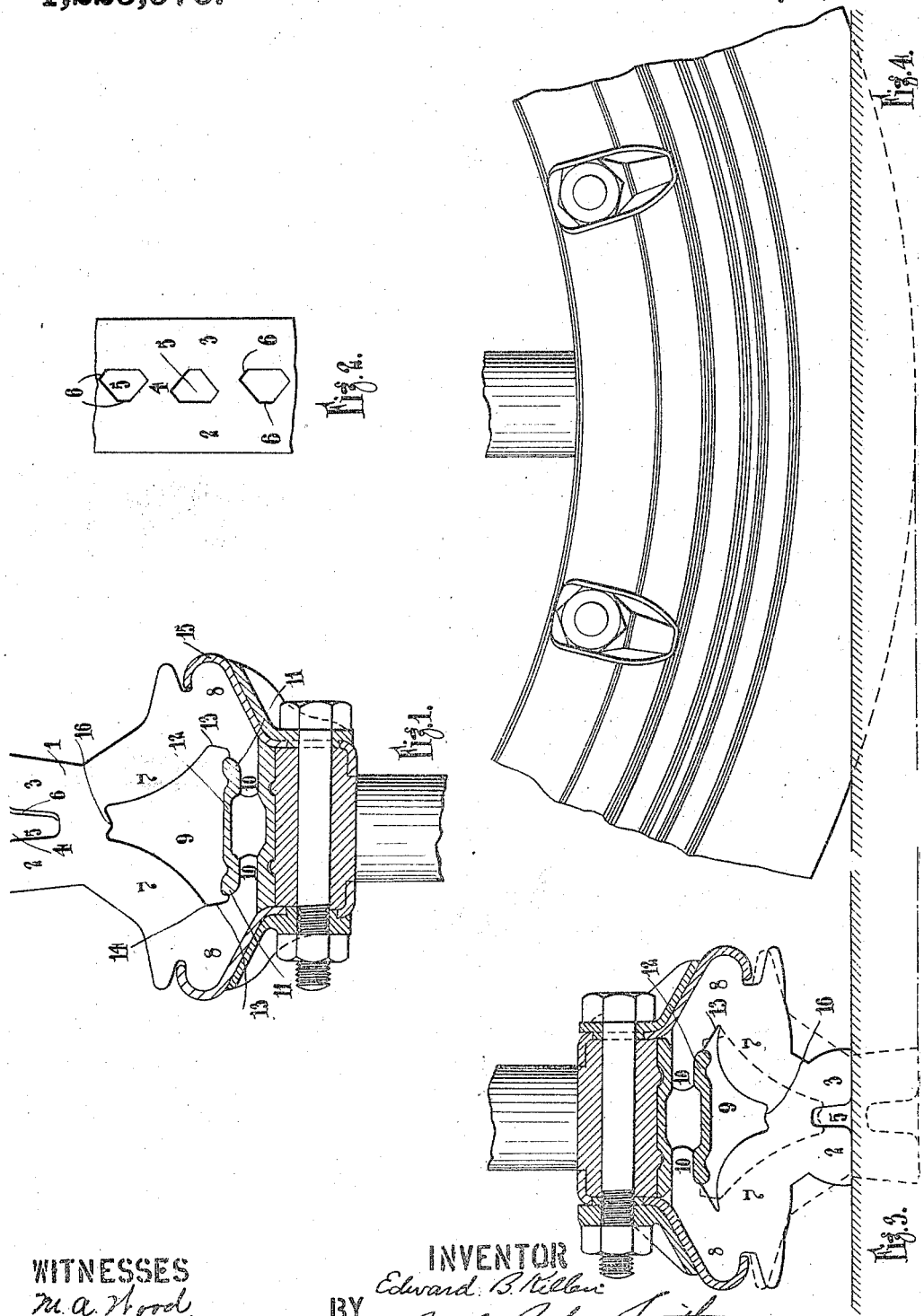

EDWARD BRICE KILLEN, OF LONDON, ENGLAND.

RUBBER TIRE AND ITS ATTACHMENT AND DETACHMENT TO AND FROM WHEELS.

1,225,973.         Specification of Letters Patent.     Patented May 15, 1917.

Application filed February 18, 1914. Serial No. 819,438.

*To all whom it may concern:*

Be it known that I, EDWARD BRICE KILLEN, a subject of the King of Great Britain and Ireland, and residing at 27 Queen Victoria street, London, E. C., England, have invented certain new and useful Improvements in and Relating to Rubber Tires and Their Attachment and Detachment to and from Wheels, of which the following is a specification.

This invention relates to rubber tires of the type having an upstanding tread that is to say, one which has substantially straight sides and has a flat treading surface so that the tread does not substantially increase in width with increase of load, and also relates to rubber tires of the type having an air chamber of roughly triangular shape in cross section.

The invention more particularly relates to air cushion tires as described in my prior application for U. S. Patent Serial No. 669754, filed January 6, 1912, and therefore, this invention may be conveniently described with reference thereto.

An object of the invention is to provide a tread possessing efficient non-skidding qualities even when upon treacherous surfaces of grease, mud, ice or snow, or on wood pavement, asphalt or stone sets, such tread also preventing slipping or skidding upon sudden application of the brakes whereby a car may be pulled up within a few yards even when traveling at a considerable speed.

A further object of the invention is to provide an air chamber of such a shape that no internal friction takes place while the tire is under load, thus preventing disintegration or cracking taking place throughout the life of the tire.

In the accompanying drawings,

Figure 1 is a cross section of a tire of the type described in my prior application above referred to, showing the formation of tread according to the present invention;

Fig. 2 is a plan view of the tread portion of Fig. 1, showing the shape and arrangement of the cavities according to the invention;

Fig. 3 illustrates the tire shown in Fig. 1 under a heavy load;

Fig. 4 is a side elevation of part of a wheel with a tire under compression corresponding to Fig. 3, and illustrates the circumferential amount of tread in ground contact under a heavy load.

In carrying out the invention according to one mode as applied to a tire such as described in my prior specification above referred to, I mold the part of the rubber tread 1 capable of being worn away, with right and left circumferential treading ribs 2 and 3 having suitable supporting stay ribs 4 formed at intervals obliquely between the treading ribs, thereby providing a number of open spaces or cavities 5 of roughly triangular shape in plan. The construction of treading and stay ribs forms the triangular cavities so that the base of each triangle is upon the same circumferential line as the apex of the next and centrally over the apex of the air chamber of the tire. The corners of the triangular space are formed so that acute angles are avoided. To effect this the angles or corners may be molded blunt or with a slight flat or extra wall such as 6 so as to form right or obtuse angles at the junction of any two surfaces, thereby preventing friction or cracking occurring on the surfaces or sides of each space when the rubber of the tread is put under compression in carrying its load. These open spaces are surrounded by walls of uniform height and are located centrally around the tread circumference after the manner shown in the drawings.

The stay tread ribs 4 connecting and supporting the treading ribs 2 and 3 give uniform lateral stiffness, and strength to the narrow upstanding tread and enable a deeper or thicker tread to be molded on the tire than when two treading ribs alone are provided, so that the tire is capable of running an increased mileage before requiring to be retreaded.

The tire is provided with side walls 7 which join the tread 1 with base beads 8 forming an air chamber 9 of triangular or gable-like cross section. The inner surface of the side walls 7 are preferably convex to increase the tendency of the walls to move inward when the tire is under load. The base beads are provided with extended toes, 10 which are preferably formed with a curved inner surface 11 to serve as a bed for the endless retaining rim 12 which is adapted to fit inside the chamber 9 and convert it into a tube of gable-like or triangular shape. The air chamber thus formed may be made airtight by the engagement of retaining rim 12 with the toes 10 and by the engagement of these toes with the wheel rim and by the engagement of the side flanges and especially their hook portions 15 with the beads 8. The compression of the beads and adjacent base portions of the tire by the side flanges and hooks 15 further assists in forcing the toes 10 into firm engagement with wheel rim and retaining rim 12.

Between each toe 10 and the inner surface of the corresponding side wall 7 extra walls 13 are formed so that the base of the air chamber is provided with right angular or obtuse, instead of acute angles. These two walls may slope outward from the toes 10, meeting the walls 7 at 14, thereby forming the widest part of the air chamber, outside the retaining rim but inside the hooked portion 15 of the side flanges of the wheel. When the tire is under load the side walls are bulged inward and the provision of the walls 13 causes this movement or hinging action to take place in a locality outside the retaining rim 12 but inside the hooked portion 15 of the side flanges. If the hinging action were to take place outside the hooked flange there would be a danger of a distortion of the walls outward under some circumstances.

The inner surfaces of the walls 2 do not meet or merge into one another at the apex of the air chamber but are separted by another extra wall in the form of an inwardly projecting rib 16 of open V-shape in cross section.

The apex rib 8 and the extra walls 7 by preventing contact between the adjacent rubber surfaces obviate serious internal friction.

Having now described my invention, what I claim as new and desire to secure by Letters Patent is:—

1. A rubber tube tire having an annular air tight chamber of substantially gable-like cross section and an upstanding tread having a right and a left treading wall with unbroken plain treading surfaces and a row of deep cavities located centrally around the upstanding tread above the apex of the gable-like air chamber, said cavities being of substantially triangular shape in plan and arranged so that the base of each triangular cavity lies upon the same circumferential line as the apex of the next and each corner of the triangular cavity being made blunt by means of extra walls, tread surface of the tire being substantially flat transversely and extending a considerable distance beyond the cavities at each side when the tread surface is free from compression so that the cavities are brought into sealed contact with the road surface substantially immediately upon engagement therewith.

2. A rubber tube tire comprising an upstanding tread, base beads, thick side walls for carrying the load inclined toward one another, joining the tread with said base beads and an endless retaining rim which together with said side walls form an airtight chamber of gable-like shape in cross-section, a rubber formation consisting of extended toes on the inner side of said beads and a short extra side wall at each of the corners of the base of the gable-like air chamber inclined outward and arranged between each extended toe and the adjacent portion of its corresponding side wall out of contact with the endless retaining rim, the junctions of the extra walls with the side walls being the widest part of the air chamber and out of contact with the endless retaining rim, as and for the purposes described.

3. A rubber tube tire comprising an upstanding tread, base beads, thick side walls for carrying the load inclined toward one another joining the tread with said base beads and forming an air tight chamber between them of gable-like shape in cross section, a rubber formation consisting of extended toes on the inner side of said beads, a short extra wall at each of the corners of the base of the gable-like air chamber arranged between each extended toe and the adjacent portion of its corresponding side walls and an extra wall in the form of an inwardly projecting rib of open V-shape in cross section at the apex of the gable-like air chamber, as and for the purposes described.

In testimony whereof I have signed my name to this specification in the presence of two subscribing witnesses.

EDWARD BRICE KILLEN.

Witnesses:
R. GIRDLESTONE,
P. A. OUTHWAITE.